US011900505B2

(12) United States Patent
Difrancesco (10) Patent No.: US 11,900,505 B2
(45) Date of Patent: Feb. 13, 2024

(54) METHOD AND DATA PROCESSING APPARATUS (71) Applicants: SONY GROUP CORPORATION, Tokyo (JP); SONY EUROPE B.V., Weybridge (GB)

(72) Inventor: Renaud Difrancesco, Basingstoke (GB)

(73) Assignees: SONY GROUP CORPORATION, Tokyo (JP); SONY EUROPE B.V., Weybridge (GB)

( * ) Notice: Subject to any disclaimer, the term of this patent is extended or adjusted under 35 U.S.C. 154(b) by 277 days.

(21) Appl. No.: 17/425,070

(22) PCT Filed: Jan. 28, 2020

(86) PCT No.: PCT/GB2020/050184
§ 371 (c)(1),
(2) Date: Jul. 22, 2021

(87) PCT Pub. No.: WO2020/157476
PCT Pub. Date: Aug. 6, 2020

(65) Prior Publication Data
US 2022/0101567 A1 Mar. 31, 2022

(30) Foreign Application Priority Data
Feb. 1, 2019 (GB) ...................... 1901404

(51) Int. Cl.
G06T 11/00 (2006.01)
G06V 10/771 (2022.01)
(Continued)

(52) U.S. Cl.
CPC .............. *G06T 11/00* (2013.01); *G06F 3/011* (2013.01); *G06V 10/40* (2022.01); *G06V 10/75* (2022.01);
(Continued)

(58) Field of Classification Search
None
See application file for complete search history.

(56) References Cited

U.S. PATENT DOCUMENTS 9,418,310 B1 * 8/2016 Chen .................... G06V 30/133
9,805,766 B1 * 10/2017 Peng ....................... G06F 18/22
(Continued)

FOREIGN PATENT DOCUMENTS

WO    WO 2016/007122 A1    1/2016

OTHER PUBLICATIONS

Fernandez-Gavilanes et al., "Creating emoji lexica from unsupervised sentiment analysis of their descriptions", Expert Systems With Applications, 2018, vol. 103, pp. 74-91.
(Continued)

*Primary Examiner* — Jwalant Amin
(74) *Attorney, Agent, or Firm* — Oblon, McClelland, Maier & Neustadt, L.L.P.

(57) ABSTRACT

A method of generating pictographic representations including receiving input content comprising textual information and a video item, the textual information being associated with the video item and aligned to a video playback timeline associated with the video item, obtaining summarization information describing the video item, selecting one or more elements from the textual information, comparing the selected elements of the textual data with the obtained summarization information, determining, based on the comparison, that one or more of the selected elements satisfy a specified comparison threshold, and identifying a pictographic representation for each of the one or more of the selected elements that are determined to satisfy the specified comparison threshold, the pictographic representations being selected from a pictographic representation set comprising a plurality of pictographic representations, and selectively outputting, with the video item, the identified pictographic representations aligned to the video playback timeline associated with the video item.

22 Claims, 3 Drawing Sheets (51) Int. Cl.
G06V 10/75 (2022.01)
G06V 10/40 (2022.01)
G10L 15/26 (2006.01)
G06V 20/40 (2022.01)
H04N 21/431 (2011.01)
G06F 3/01 (2006.01)

(52) U.S. Cl.
CPC ............ G06V 10/771 (2022.01); G06V 20/47 (2022.01); G10L 15/26 (2013.01); H04N 21/4316 (2013.01)

(56) References Cited

U.S. PATENT DOCUMENTS

| | | | |
|---|---|---|---|
| 10,187,690 | B1 | 1/2019 | Garcia et al. |
| 10,740,823 | B1 * | 8/2020 | Barakat ................ H04L 67/306 |
| 2004/0049713 | A1 | 3/2004 | Zhang |
| 2017/0052946 | A1 | 2/2017 | Gu et al. |
| 2017/0083506 | A1 | 3/2017 | Liu et al. |
| 2017/0353769 | A1 | 12/2017 | Husain et al. |
| 2019/0007643 | A1 | 1/2019 | Park et al. |
| 2020/0097764 | A1 * | 3/2020 | de Juan ................ G06F 16/532 |

OTHER PUBLICATIONS

Kacem et al., "2D Facial Expression Recognition Demonstrator", IEEE Int. Conf. on Computer Vision (ICCV), Oct. 2017, 8 total pages.

Duerscheid et al., "Beyond the Alphabet—Communication with Emojis", 2017, [Online], URL: https://www.researchgate.net/profile/Christa_Duerscheid/publication/315674101_Beyond_the_Alphabet_-_Communication_with_Emojis/links/58db98a9aca2729b7f23ec74/Beyond-the-Alphabet-Communication-with-Emojis.pdf, pp. 1-14 (with cover sheet).

Kumar et al., "A Systematic Survey of Facial Expression Recognition Techniques", Proceedings of the IEEE 2017 International Conference on Computing Methodologies and Communication (ICCMC), 2017, pp. 1074-17079.

Kundu et al., "Advancements and recent trends in Emotion Recognition using facial image analysis and machine learning models", 2017 International Conference on Electrical, Electronics, Communication, Computer and Optimization Techniques (ICEECCOT), 2017, pp. 1-6.

Mueller et al., "Emotion Recognition from Embedded Bodily Expressions and Speech during Dyadic Interactions", 2015 International Conference on Affective Computing and Intelligent Interaction (ACII), 2015, pp. 663-669.

Ghai et al., "Emotion Recognition On Speech Signals Using Machine Learning", 2017 International Conference On Big Data Analytics and computational Intelligence (ICBDACI), 2017, pp. 34-39.

Susan et al., "Measuring the Randomness of Speech Cues for Emotion Recognition", Proceedings of 2017 Tenth International Conference on Contemporary Computing (IC3), Aug. 10-12, 2017, Noida, India, 6 total pages.

Kacem et al., "A Novel Space-Time Representation on the Positive Semidefinite Cone for Facial Expression Recognition", 2017 IEEE International Conference on Computer Vision (ICCV), 2017, pp. 3180-3189.

Barbieri et al., "Multimodal Emoji Prediction", 2018, [Online], URL: https://www.researchgate.net/profile/Francesco_Ronzano/publication/323627481_Multimodal_Emoji_Prediction/links/5aa2961245851543e63c1e60/Multimodal-Emoji-Prediction.pdf, 6 total pages.

* cited by examiner

METHOD AND DATA PROCESSING APPARATUS

TECHNICAL FIELD OF THE DISCLOSURE

The present disclosure relates to methods and apparatuses for generating a pictographic representation associated with a video item.

The present application claims the Paris Convention priority of United Kingdom Patent Applicant Number 1901404.2, the contents of which are hereby incorporated by reference.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Emotion icons, also known by the portmanteau emoticons (and commonly referred herein as "pictographic representations"), have existed for several decades. These are typically entirely text and character based, often using letters, punctuation marks and numbers, and include a vast number of variations. These variations include variations by region, with Western style emoticons typically being written at a rotation of 90° anticlockwise to the direction of the text and Japanese style emoticons (known as Kaomojis) being written with the same orientation as the text. Examples of Western emoticons include :-) (a smiley face):((a sad face, without a nose) and:-P (tongue out, such as when "blowing a raspberry"), while example Kaomojis include (^_^) and (T_T) for happy and sad faces respectively. Such emoticons became widely used following the advent and proliferation of SMS and the internet in the mid to late 1990s, and were (and indeed still are) commonly used in emails, text messages, instant messaging systems and in internet forums.

More recently, emojis (from the Japanese e (picture) and moji (character)) have become widespread. These originated around the turn of the $21^{st}$ century, and are much like emoticons but are actual pictures or graphics rather than typographics. Since 2010, emojis have been encoded in the Unicode Standard (starting from version 6.0 released in October 2010) which has such allowed their standardisation across multiple operating systems and widespread use, for example in instant messaging platforms.

One major issue is the discrepancy between the rendering of the otherwise standardised Unicode system for emojis, or more generally, pictographic representations, which is left to the creative choice of designers. Across various operating systems, such as Android, Apple, Google etc., the same Unicode for an emoji or pictographic representation may be rendered in an entirely different manner. This may mean that the receiver of an emoji or pictographic representation may not appreciate or understand the nuances or even meaning of that sent by a user of a different operating system.

In view of this, there is a need for an effective and standardised way of extracting a relevant pictographic representation from textual information (or indeed additionally or alternatively from a video item or audio information which may be associated with that textual information), which can convey the same meaning and nuances, as intended by the originator of that text, video or audio, to users of devices having a range of operating systems.

Further, for users who have a relatively low level of literacy, such pictographic representations may be invaluable to their understanding or enjoyment of a video item, for example when watching a television program or a movie, when such users would struggle to comprehend the meaning of the video item through the video, audio or textual information alone.

SUMMARY OF THE DISCLOSURE

The present disclosure can help address or mitigate at least some of the issues discussed above.

According to an example embodiment of the present disclosure there is provided a method of generating pictographic representations. The method comprises receiving input content comprising textual information and a video item, the textual information being associated with the video item and aligned to a video playback timeline associated with the video item, obtaining summarisation information, the summarisation information describing the video item, selecting one or more elements from the textual information, comparing the selected elements of the textual data with the obtained summarisation information, determining, based on the comparison, that one or more of the selected elements satisfy a specified comparison threshold, identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and selectively outputting, with the video item, the identified pictographic representations aligned to the video playback timeline associated with the video item.

Various further aspects and features of the present technique are defined in the appended claims, which include a data processing apparatus, a television receiver, a tuner, a set top box, a transmission apparatus and a computer program, as well as circuitry for the data processing apparatus.

It is to be understood that the foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
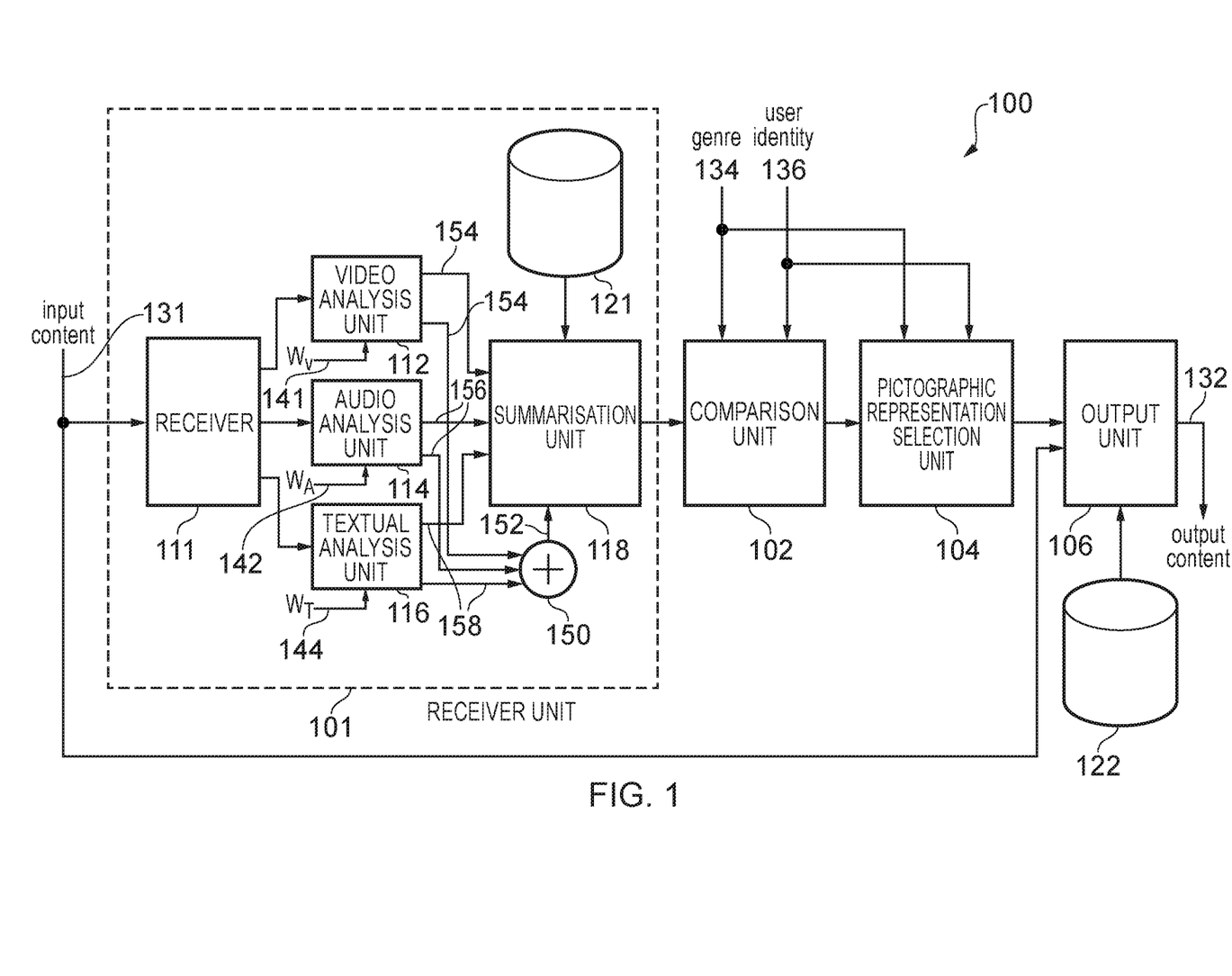
FIG. 1 provides an example of a data processing apparatus configured to carry out a pictographic representation generation process in accordance with embodiments of the present technique.

Pictographic Representation Generation Data Processing Apparatus FIG. 1 shows an example data processing apparatus 100, which is configured to carry out a method of generating pictographic representations, in accordance with embodiments of the present technique. The data processing apparatus 100 comprises a receiver unit 101 configured to receive input content 131 comprising textual information and a video item, the textual information being associated with the video item and aligned to a video playback timeline associated with the video item, and to obtain summarisation information, the summarisation information describing the video item, a comparison unit 102 configured to select one or more elements from the textual information, to compare the selected elements of the textual data with the obtained summarisation information, and to determine, based on the comparison, that one or more of the selected elements satisfy a specified comparison threshold, a pictographic representation selection unit 104 configured to identify a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and an output unit 106 configured to selectively output (as output content 132), with the video item, the identified pictographic representations aligned to the video playback timeline associated with the video item.

The receiver unit 101, upon receiving the input content 131, is configured to split the input content 131 into separate parts. In some embodiments of the present technique the input content may already be split, for example if textual data is provided separately to video data and linked by a URI or other identifying characteristics. In accordance with embodiments of the present technique, these parts are textual information and a video item (or video information), although in some arrangements and as shown in the example shown in FIG. 1, the receiver unit may also split the input content 131 into audio information (which may along with the video information, form part of the video item, or may be separate from the video item) and further textual information extracted from the video item in addition to separate textual information associated with the video item. The receiver unit 101 may comprise a plurality of sub-units, which may include (but are not limited to) a receiver 111, a video analysis unit 112 configured to analyse the video item (video information) of the input content 131, an audio analysis unit 114 configured to analyse any audio information of the input content 131 and a textual analysis unit 116 configured to analyse the textual information of the input content 131. The video information may comprise one or more of a scene, body language of one or more people in the scene and facial expressions of the one or more people in the scene. The audio information may comprise one or more of music, speech, an audio description audio track, and sound effects. The textual information may comprise one or more of a subtitle, a description of the input content, speech to text converted audio description, real-time social media data associated with the video item, and a closed caption. It should be appreciated that the receiver unit 101 may break down the input content 131 in a different way, into fewer or more parts (and may include other types of information such as still image information or the like), or may provide the input content 131 to the analysing unit in the same composite format as it is received. In other examples, the input signal 131 may not be a composite signal at all, and may be formed only of textual information or only of audio or video information, for example. Alternatively, each of the video analysis unit 112, audio analysis unit 114 and textual analysis unit 116 may perform the breaking down of the composite input signal 131 into constituent parts before the analysis is carried out.

The receiver unit 101 may also comprise a summarisation unit 118, which is responsible for the obtaining of the summarisation information describing the video item. This summarisation information may describe the whole of the video item, or may describe only a portion of the video item, this portion of the video item being temporally (i.e. in time) aligned with the selected elements of the textual information. The summarisation data may be obtained by the receiver unit 101 (and in some cases, specifically the summarisation unit 118 if the receiver unit 101 comprises such a summarisation sub-unit 118) in one or more of a number of different ways. One such way is that the receiver unit 101 is configured to receive system information and/or metadata from an external server 121 (e.g. via a summarisation unit 118), the system information and/or metadata describing the video item and to use the received system information and/or metadata to form the summarisation data. Alternatively, or in addition, the receiver unit 101 may be configured to obtain the summarisation data be segmenting image features (e.g. via a video analysis unit 112) from a portion of the video item. Alternatively, or in addition, the receiver unit 101 may be configured to identify a related video item to the current video item receiver with the input content, to identify a preamble portion of the related video item (the preamble portion comprising a summary of the current video item) and to use the preamble portion to form the summarisation information. Similarly, in some embodiments of the present technique, textual information relating to the preamble portion may be used. Sometimes the preamble is a summary of a previous episode of an item of video content and a textual summary for a current episode can be obtained from the preamble of a next episode in a series or season. If a series of episodes are linked by identification information, then the preamble (typically a short reminder or introduction portion of 1-3 minutes in duration) of a next episode, for example its subtitles, can be used to influence the identifying of pictographic representations more strongly for a current episode, for example by weighting text terms identified as relating to the preamble. The preamble provides useful, pre-curated summarisation or training data for the summarisation unit 118 or for the comparison unit 102.

Each of the video information, the audio information and the textual information may be individually weighted by weighting values 141, 142 and 144 respectively such that one or more of the video information, the audio information and the textual information has more (or less) of an impact or influence on the formation or obtaining of the summarisation information. These weighting values 141, 142 and 144 may be each respectively applied to the video information, the audio information and the textual information as a whole, or may be applied differently to the constituent parts of the video information, the audio information and the textual information, or the weighting may be a combination of the two. For example, the textual information may be weighted 144 heavier than the video information and the audio information, but of the constituent parts of the textual information, the weighting value 144 may be more heavily skewed towards a description of the video content or real-time social media data associated with the video item rather than to subtitles or the like.

The outputs 154, 156 and 158 of each of the sub-units (e.g. the video analysis unit 112, the audio analysis unit 114 and the textual analysis unit 116) of the receiver unit 101 may each be fed directly into the summarisation unit 118, or may alternatively (or in addition) be fed into a combining unit 150 in the example data processing apparatus 100 of FIG. 1. The combining unit 150 combines the outputs 154, 156 and 158 to produce a vector signal 152, which is an aggregate of these outputs 154, 156 and 158. Once produced, this vector signal 152 may form the basis of, or may itself by, the summarisation information.

No matter which way the summarisation information is produced by the receiver unit 101 (or specifically, in cases where the receiver unit 101 has one, the summarisation unit 118), this summarisation information is fed into the comparison unit 102, along with the textual information, which may be the raw textual information forming part of the input content 131, textual information related to the video item which has been extracted or received in any other manner than by the receiver unit 101 as part of the input content 131, or textual information of either of these kinds which has been analysed, in any manner, by the textual analysing unit 116 of the receiver unit 101 (should such a unit form part of the receiver unit 101). Alternatively, the comparison unit 102 itself may be configured to segment image features from a portion of the video item to identify the textual information of the input content. In some embodiments of the present technique, segmentation may be performed by picture analysis to identify edges, motion, constant blocks of colour or colours changing significantly, signifying edges in an image. The comparison unit 102 is configured to select one or more elements from the obtained textual information, to compare the selected elements of the textual data with the obtained summarisation information, and to determine, based on the comparison, that one or more of the selected elements of the obtained textual information satisfy a specified comparison threshold.

The comparison unit 102 may be configured to make the determination that one or more of the selected elements satisfy the specified comparison threshold, at least in part, in accordance with a determined genre 134 of the input content 131. Alternatively, or in addition, the comparison unit 102 may be configured to make the determination that one or more of the selected elements satisfy the specified comparison threshold, at least in part, in accordance with a determination of an identity or a location of a user 136 who is viewing the outputted video item 132.

The comparison unit 102 may be configured to compare the selected elements of the textual data with the obtained summarisation using one or more of a number of different techniques. One such technique is feature extraction, which is the process of transforming raw data into an abstract representation, which can be used for processes such as pattern classification, clustering and recognition. In this process, a so-called "feature vector" is generated, which is an abstract representation of the frequency of terms used within the selected elements of the textual data and/or summarisation information. All "stop words" may be removed in order to simplify this task; these are extremely common words on a pre-prepared list, such as "a", "the", "however", "about", "and", and "the" which serve little purpose in trying to characterise the content of the selected elements of the textual data and/or summarisation information. After removing stop-words, or otherwise, the remaining words are "stemmed", which involves finding the common stem of a word's variants. For example the words "criminality", "crimes", and "criminal" have the common stem of "crime" as a top level word. Such top-level words may then be analysed, particular in terms of their frequency of occurrence, and can be compared with a dictionary of stemmed (or otherwise) words, which may be dynamically maintained; as a word is newly encountered, it is added to the dictionary. The result of this analysis may comprise a list of terms used, along with the frequency with which those terms occur. Words that occur with too high or too low a frequency are discounted, which is to say that they are removed from the dictionary and do not take part in the analysis which follows. Words with too low a frequency may be misspellings, made up, or words having little relevance. Words that occur with too high a frequency are less appropriate for distinguishing selected elements of the textual data and/or summarisation information. For example, the term "News" may appear in about a third of the selected elements, whereas the word "football" is used in only about 2% of the selected elements. Therefore "football" can be assumed to be a more useful term than "News". Conversely, the word "fotball" (a misspelling of "football") appears only once, and so is discarded for having too low an occurrence. Such words may be defined as those having a frequency of occurrence which is lower than two standard deviations less than the mean frequency of occurrence, or which is higher than two standard deviations above the mean frequency of occurrence. The top-level words may be associated with pictograms, or a most likely pictogram may be selected to be associated with them. As described above, the comparison unit 102 may be configured to make the determination that one or more of the selected elements satisfy the specified comparison threshold, at least in part, in accordance with a determined genre 134 of the input content 131. The dictionary of top-level words and/or the pictograms associated with them may be reduced by applying a theme filter from the textual words or this determined genre 134. This may reduce mishits, for example if a textual term is ambiguous in contents or if there is a typographical error in the text as commonly occurs in subtitling. The specified comparison threshold may for example be a frequency of occurrence of a top-level word in the selected elements of the textual data and/or summarisation information.

The comparison unit 102 supplies an indication of the one or more of the selected elements of the obtained textual information that it determines have satisfied the specified comparison threshold to the pictographic representation selection unit 104, which is configured to identify a pictographic representation for each of these supplied selected elements that are determined to satisfy the specified comparison threshold. The pictographic representations are selected from a pictographic representation set comprising a plurality of pictographic representations, and the identified pictographic representations are associated with the one or more of the selected elements that are determined to satisfy the specified comparison threshold. The selection of these pictographic representations may be based on relative likelihoods, and the selected pictographic representation may have the highest relative likelihood among all the pictographic representations in the pictographic representation set. The selection may be based on known or learned correlations between various words or phrases (i.e. the selected elements of the obtained textual information that have satisfied the specified comparison) and various pictographic representations (such as emojis or emotion descriptor icons or the like).

Similarly to the determination that one or more of the selected elements satisfy the specified comparison threshold made by the comparison unit 102, the pictographic representation selection unit 104 may be configured to identify the pictographic representation for each of the supplied selected elements of the textual information that are determined by the comparison unit 102 to have satisfied the specified comparison threshold based not only on these supplied selected elements themselves, but also on a determined genre 134 of the input content. For example, a comedy movie may be more likely to be associated with happy or laughing pictographic representations, and so these may be more heavily weighted through the inputted genre signal 134, while sombre or matter-of-fact pictographic representations may be more heavily weighted through the inputted genre signal 134 when the video item is a news report. Alternatively, or in combination, the pictographic representation selection unit 104 may be configured to identify the pictographic representation for each of the supplied selected elements of the textual information that are determined by the comparison unit 102 to have satisfied the specified comparison threshold based also on a determination of an identity of a user who is viewing the output content 134. For example, if two teenagers are texting each other using their smartphones, or talking on an internet forum or instant messenger, the nuances and subtext of the textual information and words they use may be vastly different to if businessmen and women were conversing using the same language. Different pictographic representations may be selected in this case. For example, when basing a decision of which pictographic representation is most appropriate to select for input content 131 which is a reply "Yeah, right", the pictographic representation selection unit 104 may make different selections based on a user identity input 136. For the teenagers, the pictographic representation selection unit 104 may determine that the pictographic representation is sarcastic or mocking, while for the businesspeople, the pictographic representation may be more neutral, with the reply "Yeah, right" being judged to be used as a confirmation. In some arrangements, it may be that, dependent on the genre signal 134 and the user identity signal 136, only a subset of the pictographic representations may be selected from the pictographic representation set.

In some arrangements of embodiments of the present technique, the pictographic representation set is a dynamic pictographic representation dictionary; that is, the plurality of pictographic representations are stored in a dynamic pictographic representation dictionary. The number of pictographic representations in the dynamic pictographic representation dictionary may be variable, and dynamically increased or reduced over time by modifying, adding or removing pictographic representations from the dynamic pictographic representation dictionary. The pictographic representation selection unit 104 may be configured to filter the dynamic pictographic representation dictionary in accordance with either or both of a determined genre of the input content and a determination of an identity of a user who is viewing the output content 134, wherein the pictographic representation selection unit 104 is configured to select the selected pictographic representation from the filtered dynamic pictographic representation dictionary.

Once the pictographic representation selection unit 104 has identified the selected pictographic representations for each of the selected elements that had been determined by the comparison unit 102 to satisfy the specified comparison threshold, these identified pictographic representations are supplied to the output unit 106, along with the original input content 131. The output unit 106 is configured to selectively output (as output content 132), with the video item, the identified pictographic representations aligned to the video playback timeline associated with the video item. This selective outputting may comprise displaying the identified pictographic representations on their own, or appended along with the textual information, in order to present more information to the user who is viewing the output content 132. This appendage may in the form of a subtitle delivered in association with the input content 131, for example in the case of a movie or still image as the input content 131, or may for example be used at the end of (or indeed anywhere in) a sentence or paragraph, or in place of a word in that sentence or paragraph, if the input content 131 is textual, or primarily textual. The user can choose whether or not the output content 132 is displayed with the selected pictographic representation. This appended pictographic representation forming part of the output content 132 may be very valuable to visually or cognitively impaired users, or to users who do not understand the language of the input content 131, in their efforts to comprehend and interpret the output content 132. In other examples of data processing apparatus in accordance with embodiments of the present technique, the pictographic representation is not appended to the input/output content, but is instead comprises Timed Text Mark-up Language (TTML)-like subtitles which are delivered separately to the output content 132 but include timing information to associate the video of the output content 132 with the subtitle. In other examples, the selected pictographic representation may be associated with presentation timestamps. The video may be broadcast and the pictographic representations may be retrieved from an internet (or another) network connection. Using TTML-like data, textual metadata linked by URI, or other data appropriately linked to the video which is available in advance of the video, may ensure that the timeline can be better adhered to and the pictographic representation be displayed more accurately. When multiple textual sources are being used, the TTML-like data, textual metadata linked by URI, or other data appropriately linked to the video may be used in preference to other data which is available only at the time of presenting or decoding the video, or can be used to weight or otherwise influence the weighting of the textual data which is available only at the time of presenting or decoding the video such as textual data obtained from image analysis. The user identity, characterised by the user identity signal 136, may in some arrangements act as a non-linear filter, which amplifies some elements and reduces others. It thus performs a semi-static transformation of the reference neutral generator of pictographic representations. In practical terms, the neutral generator produces pictographic representations, and the user identity signal 136 "adds its touch" to it, thus transforming the pictographic representations (for example, having a higher intensity, a lower intensity, a longer chain of symbols, or a shorter chain of symbols). In other arrangements, the user identity signal 136 is treated more narrowly as the perspective by way of which the emoji match is performed (i.e. a different subset of pictographic representations may be used, or certain pictographic representations have higher likelihoods of selection than others depending on the user identity signal 136.

The pictographic representation set is shown in the example of FIG. 1 as being stored in a memory 122 coupled with the output unit 106. This memory 122 may be separate to the output unit 106, or may be integrated with the output unit 106. Alternatively, instead of memory 122 pictographic representation set could be stored on a server, which are operated by the same or a different operator to the data processing apparatus 100. The memory 122 may be implemented as RAM, or may include long-term or permanent memory, such as flash memory, hard disk drives and/or ROM. It should be appreciated that pictographic representations may be updated, added or removed from the memory (or server) 122, and this updating/adding/removing may be carried out by the operator of the data processing system 100 or by a separate operator.

As described above, the input content 131 may comprise audio information comprising an audio description audio track. Here, the receiver unit 101 may be configured to identify portions of the audio description audio track, the audio description audio track relating to speech representations of one or more items of text in the video item, and to identify pictographic representations for the items of text in the video item represented by the identified portions of the audio description audio track. Furthermore, the output unit 106 may be configured to selectively output, with the video item, the identified pictographic representations for the items of text (relating to the speech representations of the audio description audio track) in the video item aligned to the video playback timeline associated with the video item.

The textual information may be obtained in a plurality of different ways. Primarily, the textual information comprises one or more of a subtitle, a description of the video item, speech to text converted audio description, real-time social media data associated with the video item, and a closed caption. The textual information may also be generated through analysis of the video item, or occurrences of text within the images or video content themselves, such as a signpost, building or street name, or a newspaper being read. The textual information may include a parallel subtitles stream, for example carried in a transport stream associated with the video content or network (internet) delivered subtitles synchronised to the video content for example in the form of a ttml stream (ttml streams may be translated between languages on the fly). The textual information may be generated from audio information, through a speech to text engine that provides subtitle data, or through an audio description stream which as well as including the audio includes commentary generally for visually impaired users describing a scene. Audio description may also be provided by a time synchronised text stream which is converted to audio by a text to speech engine. The textual information may also comprise a translation of a foreign language subtitle stream. The textual information may be obtained elsewhere than through the input content/video item itself, such as through computer generated descriptions of video, metadata included in broadcast System Information data which accompanies the video content (which may include a description or synopsis), or metadata provided on the internet by providing an identifier linking the video data with records in a metadata database provided by, for example Gracenote or IMDB.

As described above, embodiments of the present disclosure provide data processing apparatus which are operable to carry out methods of generating pictographic representations. According to one embodiment, such a method comprises receiving input content comprising textual information and a video item, the textual information being associated with the video item and aligned to a video playback timeline associated with the video item, obtaining summarisation information, the summarisation information describing the video item, selecting one or more elements from the textual information, comparing the selected elements of the textual data with the obtained summarisation information, determining, based on the comparison, that one or more of the selected elements satisfy a specified comparison threshold, identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and selectively outputting, with the video item, the identified pictographic representations aligned to the video playback timeline associated with the video item.

According to another embodiment of the disclosure, there is provided a method comprising receiving input content comprising one or more of a video item, audio information and textual information, the textual information being associated with the video item and aligned to a video playback timeline associated with the video item, obtaining summarisation information, the summarisation information describing the video item, selecting one or more elements from the textual information, performing analysis on the input content to produce a vector information which aggregates the one or more of the video item, the audio information and the textual information in accordance with individual weighting values applied to each of the one or more of the video item, the audio information and the textual information, selecting one or more elements from the vector information, comparing the selected elements of the vector information with the obtained summarisation information, determining, based on the comparison, that one or more of the selected elements satisfy a specified comparison threshold, identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and selectively outputting, with the video item, and optionally with the textual information aligned to the video playback timeline of the video item, the identified pictographic representations aligned to the video playback timeline associated with the video item. The vector information may be considered to be feature data or a machine generated summary or quantization of selected input data.

Circuitry configured to perform some or all of the steps of the methods described herein is within the scope of the present disclosure. Circuitry configured to send or receive information as input or output from some or all of the steps of the methods described herein is within the scope of the present disclosure.

In embodiments of the present technique the language of any audio, text or metadata accompanying the video may influence the pictographic representation analysis, identification and selection. Here, the language detected may form an input to the pictographic representation analysis (i.e. to the pictographic representation selection unit). The language may be used to define the set of pictographic representations, for example, each language has its own set of pictographic representation s or the language can filter a larger set of pictographic representations. Where the pictographic representations relate to emotions (i.e. are emoticons/emojis for example), some languages may be tied to cultures where the population one culture express fewer or more emotions than others. In embodiments of the present technique, the location of a user may be detected, for example, by GPS or geolocation, and that location may determine or filter a set of pictographic representations applied to an item of content (e.g. a video item).

Co-pending United Kingdom patent application with application number 1806325.5, the contents of which are hereby incorporated by reference, describes how emojis can be derived from video content (as well as audio and textual content) based on their association with determined emotion states of the video, and appended to subtitles of the video content. In contrast, data processing apparatuses configured in accordance with embodiments of the present technique, such as the data processing apparatus 100 of FIG. 1, carry out methods of determining relevant pictographic representations to display along with both real-time and pre-recorded input content, where here, this input content is primarily textual information, which may be extracted from video/audio information relating to or forming part of the input content, or may be textual information associated with, for example, a video item forming part of the input content where this associated textual information is retrieved from elsewhere. Thus, in contrast to the teaching of co-pending United Kingdom patent application number 1806325.5, embodiments of the present technique involve the comparison of textual information associated with a video item with summarisation information describing the video item, and identifying and displaying pictographic representations, aligned to the video playback timeline associated with the video item, for those elements of the textual information which satisfy a specified comparison threshold when compared to the summarisation information.

Insofar as data processing apparatuses according to embodiments of the present technique may be configured to operate in practice, for every video signal, the data processing apparatus is configured to:

(i) extract in real time, or perform prior to playback, text occurrence analysis in pictures, scene/object identification, followed by qualification (such as web information collection).

For instance a Las Vegas Hotel is on screen and its name appears written on its top. The name is extracted. An instant search (or prior indexation after search) gives key details on the hotel (or points of interest), for instance "name, location, category". Another example is road or street signs located in the picture.

(ii) analyse the above, in addition to subtitles indexing the video.

This may involve the performing of a pictogram/visual cue matching search in a predefined dictionary. This can be done using machine learning on subtitle-based scene descriptors and visual symbol rendering. Scene descriptors are quantised by states in visual dictionary. An example may relate to city scenes, such as a food market, suburban storage spaces, etc. Locations could be symbolised by known visual summaries, e.g. the Eiffel Tower for Paris.

(iii) style the visual rendering for purpose (personalisation).

A scene of crime in Paris shown by a newspaper title on-screen, may be summarised by a gun and Eiffel Tower. It may also be, for example a laying corpse, along with the Eiffel Tower and a river, if a dead body was found in the Seine river.

Figure 2:
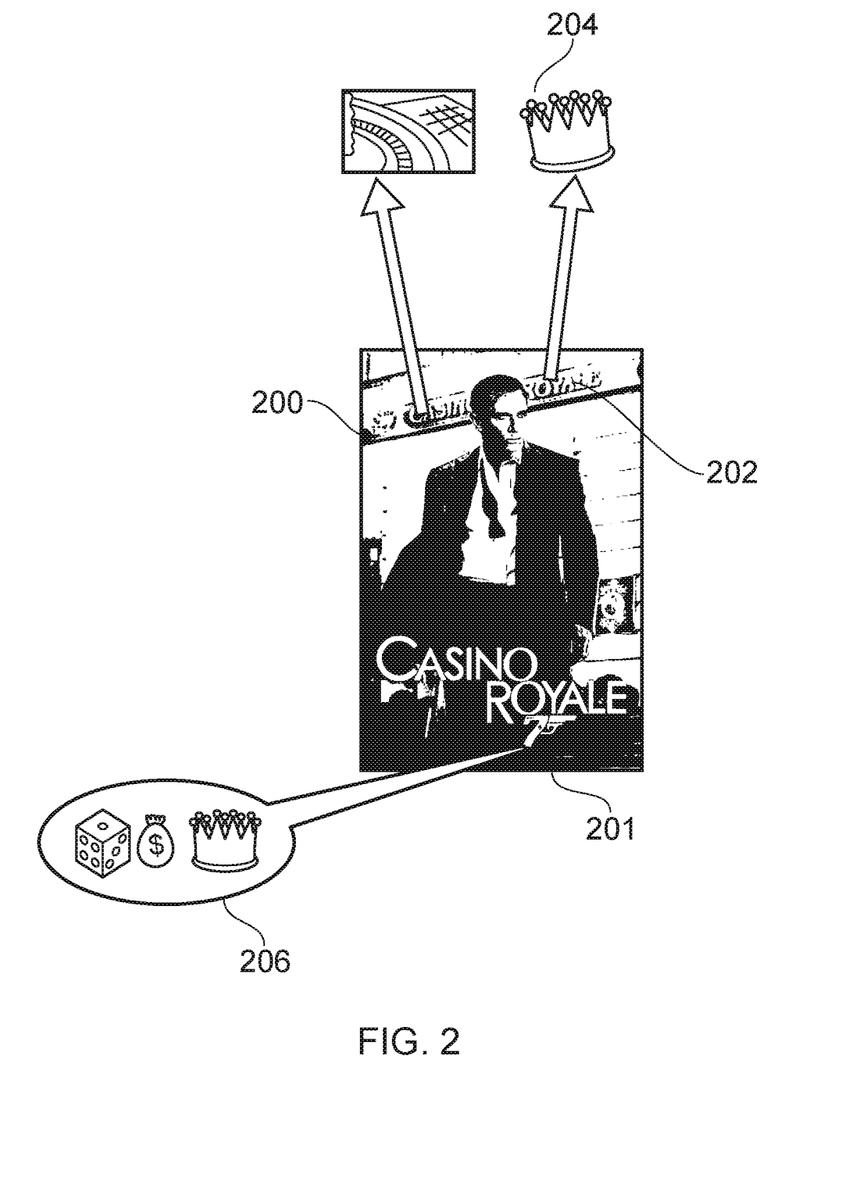
FIG. 2 shows an example of how pictographic representations may be extracted from textual information forming part of or relating to a video item in accordance with embodiments of the present technique.

For example, FIG. 2 shows how textual information may be extracted from a picture 200 showing a cinematic poster for the James Bond film Casino Royale. In this picture 200, there are two occurrences of text; both the title of the movie 201, and the name of aforementioned hotel/casino 202. These are then analysed, in combination with any subtitles indexing the video or textual information associated with the picture 200 which can be extracted from elsewhere. Following this, pictographic representations of the text are generated, which may include a casino wheel and crown 204, or may include dice, a bag of money, and a crown 206.

Such a visual support scene summary can help several categories of users, which may include but is not limited to people with literacy issues, and people with cognitive issues, so that they are more easily able to follow the story/the programme.

In some embodiments of the present technique, the video information may depict two or more actors in conversation, and the textual information may relate to this conversation. When subtitles are generated for the two actors based on the textual information and/or textual information extracted from the video information for simultaneous display, they may be differentiated from one another by being displayed in different colours or respective positions some other distinguishing attribute. Similarly, pictographic representations may be assigned or associated with different attributes such as colours or display coordinates.

In some embodiments of the present technique, the circuitry may determine that more than one pictographic representations is appropriate at a single point in time. For example, with respect to the example of FIG. 2 as described above, Casino Royale in the James Bond film of the same name may be depicted by a plurality of pictographic representations, such as dice, a money bag, and a crown. In some embodiments of the present technique, the pictographic representations may be displayed in spatial isolation from any textual subtitle or caption. In some embodiments of the present technique, the pictographic representations may be displayed within the text of the subtitle or caption. In some embodiments of the present technique, the pictographic representations may be rendered as Portable Network Graphics (PNG Format) or another format in which graphics may be richer than simple text or ASCII characters.

In embodiments of the present technique, there are two distinct variant arrangements in which the pictographic representations (e.g. emojis) can be generated. The first of these is spot-emoji generation, in which there is no-delay, instant selection at each time t over a common timeline of the best emoji $e^*(t)$ from among all the emoji candidates e. According to the spot-emoji generation arrangement, each of a plurality of pictographic representations are sequentially selected instantaneously at each given time interval t. In other words, with reference to at least the data processing apparatus of FIG. 1 as described above and the method as shown in FIG. 3 as described below, the data processing apparatus is configured to perform the steps of comparing the selected elements of the textual data with the obtained summarisation information, determining that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, each time there is a change in the video item, textual information or audio information of the input content.

The second of these is emoji-time series generation, in which a selection is made at time t+N of the best emoji sequence e*(t), ..., e*(t+N) among all candidate emojis e. Here, a plurality of emojis may be selected as the emoji sequence at time t+N. In other words, with reference to at least the data processing apparatus of FIG. 1 as described above and the method as shown in FIG. 3 as described below, the data processing apparatus is configured to perform the steps of comparing the selected elements of the textual data with the obtained summarisation information, determining, that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, on the input content once for each of one or more windows of time in which the input content is received.

It should be noted by those skilled in the art that the spot-emoji determination arrangement corresponds to a word level analysis, whereas an emoji-time series determination corresponds to a sentence level analysis, and hence provides an increased stability and semantic likelihood among select emojis when compared to the spot-emoji generation arrangement. The time series works on trajectories (hence carrying memories and likelihoods of future transitions), whereas spot-emojis are simply isolated points of determination.

Figure 3:
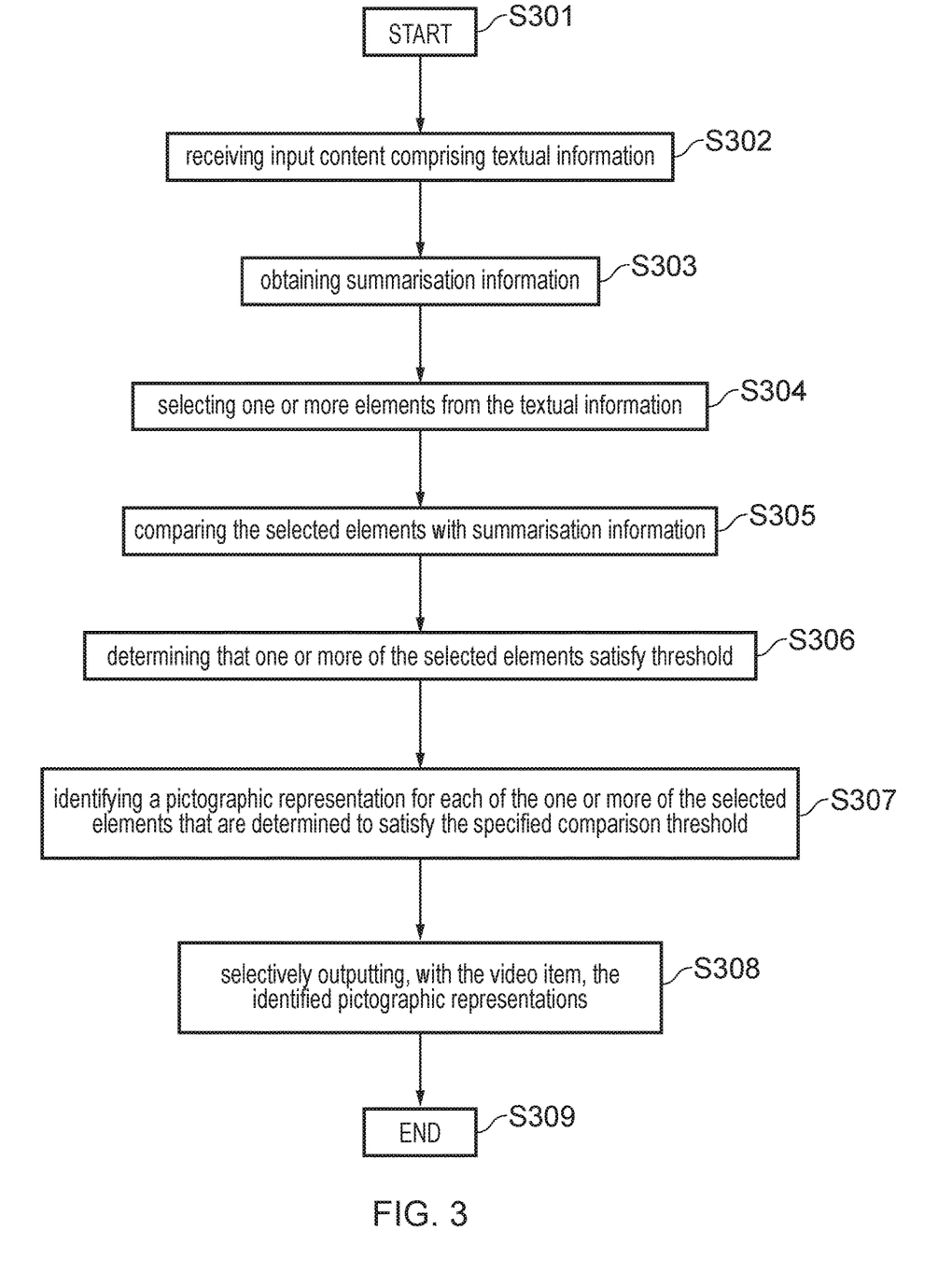
FIG. 3 shows an example of a flow diagram illustrating a process of generating pictographic representations carried out by a data processing system in accordance with embodiments of the present technique.

FIG. 3 shows an example of a flow diagram illustrating a process of generating pictographic representations carried out by a data processing system in accordance with embodiments of the present technique. The process starts in step S301. In step S302, the method comprises receiving input content comprising textual information and a video item, the textual information being associated with the video item and aligned to a video playback timeline associated with the video item. In step S303, the method comprises obtaining summarisation information, the summarisation information describing the video item. The process then advances to step S304, which comprises selecting one or more elements from the textual information. In step S305, the process comprises comparing the selected elements of the textual data with the obtained summarisation information. The method then moves to step S306, which comprises determining, based on the comparison, that one or more of the selected elements satisfy a specified comparison threshold. Step S307 then comprises identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and step S308 comprises selectively outputting, with the video item, the identified pictographic representations aligned to the video playback timeline associated with the video item. The process ends in step S309.

Those skilled in the art would appreciate that the method shown by FIG. 3 may be adapted in accordance with embodiments of the present technique. For example, other intermediate steps may be included in the method, or the steps may be performed in any logical order. Similarly, those would appreciate that such a method may be carried out by a data processing apparatus other than that which is described in relation to FIG. 1. For example, different units or circuitries may be included than those which are shown and described, or the steps of the method may be delegated in a different way between the units involved.

Data processing apparatuses as described herein may be at the receiver side, or the transmitter side of an overall system. For example, the data processing apparatus may form part of a television receiver, a tuner or a set top box, or may alternatively form part of a transmission apparatus for transmitting a television program for reception by one of a television receiver, a tuner or a set top box.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "some embodiments", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fibre optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the embodiments described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains, within the scope of the appended claims.

Various further aspects and features of the present technique are defined in the appended claims. Various modifications may be made to the embodiments hereinbefore described within the scope of the appended claims.

The following numbered paragraphs provide further example aspects and features of the present technique:

Paragraph 1. A method of generating pictographic representations, the method comprising:
  receiving input content comprising textual information and a video item, the textual information being associated with the video item and aligned to a video playback timeline associated with the video item;
  obtaining summarisation information, the summarisation information describing the video item;
  selecting one or more elements from the textual information;
  comparing the selected elements of the textual data with the obtained summarisation information;
  determining, based on the comparison, that one or more of the selected elements satisfy a specified comparison threshold;
  identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold; and
  selectively outputting, with the video item, the identified pictographic representations aligned to the video playback timeline associated with the video item.

Paragraph 2. A method according to Paragraph 1, wherein the selective outputting comprises displaying the identified pictographic representations along with the textual information.

Paragraph 3. A method according to Paragraph 1 or Paragraph 2, wherein the video item comprises one or more of a scene, body language of one or more people in the scene and facial expressions of the one or more people in the scene.

Paragraph 4. A method according to any of Paragraphs 1 to 3, wherein the input content further comprises audio information comprising one or more of music, speech, an audio description audio track and sound effects, and the textual information is associated with both the audio information and the video item.

Paragraph 5. A method according to Paragraph 4, comprising:
  identifying portions of the audio description audio track, the audio description audio track relating to speech representations of one or more items of text in the video item;
  identifying pictographic representations for the items of text in the video item; and
  selectively outputting, with the video item, the identified pictographic representations for the items of text in the video item aligned to the video playback timeline associated with the video item.

Paragraph 6. A method according to any of Paragraphs 1 to 5, wherein the textual information comprises one or more of a subtitle, a description of the video item, speech to text converted audio description, real-time social media data associated with the video item, and a closed caption.

Paragraph 7. A method according to any of Paragraphs 1 to 6, wherein the summarisation information describes the whole of the video item.

Paragraph 8. A method according to any of Paragraphs 1 to 7, wherein the summarisation information describes a portion of the video item, the portion of the video item being temporally aligned with the selected elements of the textual information.

Paragraph 9. A method according to any of Paragraphs 1 to 8, wherein the obtaining the summarisation information comprises:
  receiving system information and/or metadata from an external server, the system information and/or metadata describing the video item; and
  using the received system information and/or metadata to form the summarisation data.

Paragraph 10. A method according to any of Paragraphs 1 to 9, wherein the obtaining the summarisation information comprises segmenting image features from a portion of the video item.

Paragraph 11. A method according to any of Paragraphs 1 to 10, comprising:
  segmenting image features from a portion of the video item to identify the textual information of the input content.

Paragraph 12. A method according to any of Paragraphs 1 to 11, comprising:
  identifying a related video item to the current video item received with the input content;
  identifying a preamble portion of the related video item, the preamble portion comprising a summary of the current video item; and
  using the preamble portion to form the summarisation information.

Paragraph 13. A method according to any of Paragraphs 1 to 12, wherein the steps of comparing the selected elements of the textual data with the obtained summarisation information, determining, that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, are performed each time there is a change in the video item, textual information or audio information of the input content.

Paragraph 14. A method according to any of Paragraphs 1 to 13, wherein the steps of comparing the selected elements of the textual data with the obtained summarisation information, determining, that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, are performed on the input content once for each of one or more windows of time in which the input content is received.

Paragraph 15. A method according to any of Paragraphs 1 to 14, wherein the determination that one or more of the selected elements satisfy the specified comparison threshold is made, at least in part, in accordance with a determined genre of the input content.

Paragraph 16. A method according to any of Paragraphs 1 to 15, wherein the determination that one or more of the selected elements satisfy the specified comparison threshold is made, at least in part, in accordance with a determination of an identity or a location of a user who is viewing the outputted video item.

Paragraph 17. A method according to any of Paragraphs 1 to 16, wherein the plurality of pictographic representations are stored in a dynamic pictographic representation dictionary.

Paragraph 18. A method according to Paragraph 17, comprising filtering the dynamic pictographic representation dictionary in accordance with a determined genre of the input content, wherein the selected pictographic representation is selected from the filtered dynamic pictographic representation dictionary.

Paragraph 19. A method according to Paragraph 17 or Paragraph 18, comprising filtering the dynamic pictographic representation dictionary in accordance with a determination of an identity of a user who is viewing the output content, wherein the selected pictographic representation is selected from the filtered dynamic pictographic representation dictionary.

Paragraph 20. A method according to any of Paragraphs 1 to 19, wherein the summarisation information representing the video item is a vector signal which aggregates the video item with audio information of the input content and the textual information in accordance with individual weighting values applied to each of the one or more of the video item, the audio information and the textual information.

Paragraph 21. A data processing apparatus comprising:
 a receiver unit configured to receive input content comprising textual information and a video item, the textual information being associated with the video item and aligned to a video playback timeline associated with the video item, and to obtain summarisation information, the summarisation information describing the video item;
 a comparison unit configured to select one or more elements from the textual information, to compare the selected elements of the textual data with the obtained summarisation information, and to determine, based on the comparison, that one or more of the selected elements satisfy a specified comparison threshold;
 a pictographic representation selection unit configured to identify a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold; and
 an output unit configured to selectively output, with the video item, the identified pictographic representations aligned to the video playback timeline associated with the video item.

Paragraph 22. A data processing apparatus according to Paragraph 21, wherein the selective outputting by the output unit comprises displaying the identified pictographic representations along with the textual information.

Paragraph 23. A data processing apparatus according to Paragraph 21 or Paragraph 22, wherein the video item comprises one or more of a scene, body language of one or more people in the scene and facial expressions of the one or more people in the scene.

Paragraph 24. A data processing apparatus according to any of Paragraphs 21 to 23, wherein the input content further comprises audio information comprising one or more of music, speech, an audio description audio track and sound effects, and the textual information is associated with both the audio information and the video item.

Paragraph 25. A data processing apparatus according to Paragraph 24, wherein the receiver unit is configured:
 to identify portions of the audio description audio track, the audio description audio track relating to speech representations of one or more items of text in the video item; and
 to identify pictographic representations for the items of text in the video item represented by the identified portions of the audio description audio track; and wherein
 the output unit is configured to selectively output, with the video item, the identified pictographic representations for the items of text in the video item aligned to the video playback timeline associated with the video item.

Paragraph 26. A data processing apparatus according to any of Paragraphs 21 to 25, wherein the textual information comprises one or more of a subtitle, a description of the video item, speech to text converted audio description, real-time social media data associated with the video item, and a closed caption.

Paragraph 27. A data processing apparatus according to any of Paragraphs 21 to 26, wherein the summarisation information describes the whole of the video item.

Paragraph 28. A data processing apparatus according to any of Paragraphs 21 to 27, wherein the summarisation information describes a portion of the video item, the portion of the video item being temporally aligned with the selected elements of the textual information.

Paragraph 29. A data processing apparatus according to any of Paragraphs 21 to 28, wherein the receiver unit is configured:
 to receive system information and/or metadata from an external server, the system information and/or metadata describing the video item; and
 to use the received system information and/or metadata to form the summarisation data.

Paragraph 30. A data processing apparatus according to any of Paragraphs 21 to 29, wherein the obtaining the summarisation information by the receiver unit comprises segmenting image features from a portion of the video item.

Paragraph 31. A data processing apparatus according to any of Paragraphs 21 to 30, wherein the comparison unit is configured:

to segment image features from a portion of the video item to identify the textual information of the input content.

Paragraph 32. A data processing apparatus according to any of Paragraphs 21 to 31, wherein the receiver unit is configured:
to identify a related video item to the current video item received with the input content; to identify a preamble portion of the related video item, the preamble portion comprising a summary of the current video item; and
to use the preamble portion to form the summarisation information.

Paragraph 33. A data processing apparatus according to any of Paragraphs 21 to 32, wherein the data processing apparatus is configured to perform the steps of comparing the selected elements of the textual data with the obtained summarisation information, determining, that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, each time there is a change in the video item, textual information or audio information of the input content.

Paragraph 34. A data processing apparatus according to any of Paragraphs 21 to 33, wherein the data processing apparatus is configured to perform the steps of comparing the selected elements of the textual data with the obtained summarisation information, determining, that one or more of the selected elements satisfy the specified comparison threshold, identifying the pictographic representation for each of the one or more of the selected elements that are determined to satisfy the specified comparison threshold, and selectively outputting, with the video item, the identified pictographic representations aligned to the video playback timeline associated with the video item, on the input content once for each of one or more windows of time in which the input content is received.

Paragraph 35. A data processing apparatus according to any of Paragraphs 21 to 34, wherein the comparison unit is configured to make the determination that one or more of the selected elements satisfy the specified comparison threshold, at least in part, in accordance with a determined genre of the input content.

Paragraph 36. A data processing apparatus according to any of Paragraphs 21 to 35, wherein the comparison unit is configured to make the determination that one or more of the selected elements satisfy the specified comparison threshold, at least in part, in accordance with a determination of an identity or a location of a user who is viewing the outputted video item.

Paragraph 37. A data processing apparatus according to any of Paragraphs 21 to 36, wherein the plurality of pictographic representations are stored in a dynamic pictographic representation dictionary.

Paragraph 38. A data processing apparatus according to Paragraph 37, comprising filtering the dynamic pictographic representation dictionary in accordance with a determined genre of the input content, wherein the pictographic representation selection unit is configured to select the selected pictographic representation from the filtered dynamic pictographic representation dictionary.

Paragraph 39. A data processing apparatus according to Paragraph 37 or Paragraph 28, comprising filtering the dynamic pictographic representation dictionary in accordance with a determination of an identity of a user who is viewing the output content, wherein the pictographic representation selection unit is configured to select the selected pictographic representation from the filtered dynamic pictographic representation dictionary.

Paragraph 40. A data processing apparatus according to any of Paragraphs 21 to 39, wherein the summarisation information representing the video item is a vector signal which aggregates the video item with audio information of the input content and the textual information in accordance with individual weighting values applied to each of the one or more of the video item, the audio information and the textual information.

Paragraph 41. A television receiver comprising a data processing apparatus according to any of Paragraphs 21 to 40.

Paragraph 42. A tuner comprising a data processing apparatus according to any of Paragraphs 21 to 40.

Paragraph 43. A set top box for receiving a television programme, the set top box comprising a data processing apparatus according to any of Paragraphs 21 to 40.

Paragraph 44. A transmission apparatus for transmitting a television programme for reception by one of a television receiver, a tuner or a set-top box, the transmission apparatus comprising a data processing apparatus according to any of Paragraphs 21 to 40.

Paragraph 45. A computer program for causing a computer when executing the computer program to perform the method according to any of Paragraphs 1 to 20.

Paragraph 46. Circuitry for a data processing apparatus comprising:
receiver circuitry configured to receive input content comprising textual information and a video item, the textual information being associated with the video item and aligned to a video playback timeline associated with the video item, and to obtain summarisation information, the summarisation information describing the video item;
comparison circuitry configured to select one or more elements from the textual information, to compare the selected elements of the textual data with the obtained summarisation information, and to determine, based on the comparison, that one or more of the selected elements satisfy a specified comparison threshold;
pictographic representation selection circuitry configured to identify a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold; and
output circuitry configured to selectively output, with the video item, the identified pictographic representations aligned to the video playback timeline associated with the video item.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Similarly, method steps have been described in the description of the example embodiments and in the appended claims in a particular order. Those skilled in the art would appreciate that any suitable order of the method steps, or indeed combination or separation of currently separate or combined method steps may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

RELATED ART

United Kingdom patent application, application number 1806325.5, "Emojis in Subtitles Derived from Video and Subtitling Text," Sony Corporation, 18 Apr. 2018.

M. Ghai, S. Lal, S. Duggal and S. Manik, "Emotion recognition on speech signals using machine learning," 2017 *International Conference on Big Data Analytics and Computational Intelligence (ICBDAC)*, Chirala, 2017, pp. 34-39. doi: 10.1109/ICBDACI.2017.8070805

S. Susan and A. Kaur, "Measuring the randomness of speech cues for emotion recognition," 2017 *Tenth International Conference on Contemporary Computing (IC3)*, Noida, 2017, pp. 1-6. doi: 10.1109/IC3.2017.8284298

T. Kundu and C. Saravanan, "Advancements and recent trends in emotion recognition using facial image analysis and machine learning models," 2017 *International Conference on Electrical, Electronics, Communication, Computer, and Optimization Techniques (ICEECCOT)*, Mysuru, 2017, pp. 1-6. doi: 10.1109/ICEECCOT.2017.8284512

Y. Kumar and S. Sharma, "A systematic survey of facial expression recognition techniques," 2017 *International Conference on Computing Methodologies and Communication (ICCMC)*, Erode, 2017, pp. 1074-1079. doi: 10.1109/ICCMC.2017.8282636

P. M. Müller, S. Amin, P. Verma, M. Andriluka and A. Bulling, "Emotion recognition from embedded bodily expressions and speech during dyadic interactions," 2015 International Conference on Affective Computing and Intelligent Interaction (ACII), Xi'an, 2015, pp. 663-669. doi: 10.1109/ACII.2015.7344640

Francesco Barbieri, Miguel Ballesteros, Francesco Ronzano, Horacio Saggion, "Multimodal Emoji Prediction," [Online], Available at: https://www.researchgate.net/profile/Francesco_Ronzano/publication/323627481_Multimodal_Emoji_Prediction/links/5aa2961245851543e63c1e60/Multimodal-Emoji-Prediction.pdf Christa Dürscheid, Christina Margrit Siever, "Communication with Emojis," [Online], Available at: haps://www.researchgate.net/profile/Christa_Duerscheid/publication/315674101_Beyond_the_Alphabet_-_Communication_with_Emojis/links/58db98a9aca272967f23ec74/Beyond-the-Alphabet-Communication-with-Emojis.pdf

What is claimed is:

1. A method of generating pictographic representations, the method comprising:
   receiving input content comprising textual information and a video item, the textual information being derived from the video item and aligned to a video playback timeline associated with the video item;
   obtaining summarization information, the summarization information describing the video item;
   selecting one or more elements from the textual information;
   comparing, by circuitry, the selected elements of textual data with the obtained summarization information;
   determining, based on the comparison, that one or more of the selected elements satisfy a specified comparison threshold;
   identifying a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold; and
   selectively outputting, with the video item, the identified pictographic representations aligned to the video playback timeline associated with the video item.

2. The method according to claim 1, wherein the selective outputting comprises displaying the identified pictographic representations along with the textual information.

3. The method according to claim 1, wherein the video item comprises one or more of a scene, body language of one or more people in the scene and facial expressions of the one or more people in the scene.

4. The method according to claim 1, wherein the input content further comprises audio information comprising one or more of music, speech, an audio description audio track and sound effects, and the textual information is associated with both the audio information and the video item.

5. The method according to claim 4, comprising:
   identifying portions of the audio description audio track, the audio description audio track relating to speech representations of one or more items of text in the video item;
   identifying pictographic representations for the items of text in the video item; and
   selectively outputting, with the video item, the identified pictographic representations for the items of text in the video item aligned to the video playback timeline associated with the video item.

6. The method according to claim 1, wherein the textual information comprises one or more of a subtitle, a description of the video item, speech to text converted audio description, real-time social media data associated with the video item, and a closed caption.

7. The method according to claim 1, wherein the summarization information describes the whole of the video item.

8. The method according to claim 1, wherein the summarization information describes a portion of the video item, the portion of the video item being temporally aligned with the selected elements of the textual information.

9. The method according to claim 1, wherein the obtaining the summarization information comprises:
receiving system information and/or metadata from an external server, the system information and/or metadata describing the video item; and
using the received system information and/or metadata to form summarization data.

10. The method according to claim 1, wherein the obtaining the summarization information comprises segmenting image features from a portion of the video item.

11. The method according to claim 1, comprising:
segmenting image features from a portion of the video item to identify the textual information of the input content.

12. The method according to claim 1, comprising:
identifying a related video item to a current video item received with the input content;
identifying a preamble portion of the related video item, the preamble portion comprising a summary of the current video item; and
using the preamble portion to form the summarization information.

13. The method according to claim 1, wherein the determination that one or more of the selected elements satisfy the specified comparison threshold is made, at least in part, in accordance with a determined genre of the input content.

14. The method according to claim 1, wherein the determination that one or more of the selected elements satisfy the specified comparison threshold is made, at least in part, in accordance with a determination of an identity or a location of a user who is viewing the outputted video item.

15. The method according to claim 1, wherein the plurality of pictographic representations are stored in a dynamic pictographic representation dictionary.

16. The method according to claim 15, comprising filtering the dynamic pictographic representation dictionary in accordance with a determined genre of the input content, wherein the selected pictographic representation is selected from the filtered dynamic pictographic representation dictionary.

17. The method according to claim 15, comprising filtering the dynamic pictographic representation dictionary in accordance with a determination of an identity of a user who is viewing the output content, wherein the selected pictographic representation is selected from the filtered dynamic pictographic representation dictionary.

18. The method according to claim 1, wherein the summarization information representing the video item is a vector signal which aggregates the video item with audio information of the input content and the textual information in accordance with individual weighting values applied to each of the one or more of the video item, the audio information and the textual information.

19. The method according to claim 1, wherein the obtaining the summarization information further comprises:
receiving system information and/or metadata from an external server, the system information and/or metadata describing the video item,
using the received system information and/or metadata to form summarization data, and
segmenting image features from a portion of the video item.

20. The method according to claim 19, wherein the input content is one of a movie, television program, or a broadcast received via a network connection.

21. A data processing apparatus comprising:
processing circuitry configured to:
receive input content comprising textual information and a video item, the textual information being derived from the video item and aligned to a video playback timeline associated with the video item,
obtain summarization information, the summarization information describing the video item,
select one or more elements from the textual information, to compare the selected elements of textual data with the obtained summarization information,
determine, based on the comparison, that one or more of the selected elements satisfy a specified comparison threshold,
identify a pictographic representation for each of the one or more of the selected elements that are determined to satisfy the specified comparison threshold, the pictographic representations being selected from a pictographic representation set comprising a plurality of pictographic representations, the identified pictographic representations being associated with the one or more of the selected elements that are determined to satisfy the specified comparison threshold, and
selectively output, with the video item, the identified pictographic representations aligned to the video playback timeline associated with the video item.

22. A non-transitory storage medium comprising computer readable instructions which when executed by a computer perform the method according to claim 1.

* * * * *